(12) United States Patent
Kim (10) Patent No.: US 7,490,796 B2
(45) Date of Patent: Feb. 17, 2009

(54) MOUNT FOR IMAGE DISPLAY APPARATUS

(75) Inventor: Mun Hwan Kim, Kyungsangbook-do (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 11/157,929

(22) Filed: Jun. 22, 2005

(65) Prior Publication Data

US 2006/0033847 A1 Feb. 16, 2006

(30) Foreign Application Priority Data

Aug. 12, 2004 (KR) .............. 10-2004-0063473

(51) Int. Cl.
*F16M 11/00* (2006.01)
(52) U.S. Cl. .............. 248/157; 248/599; 248/600; 248/123.11; 248/292.12; 248/917; 361/681
(58) Field of Classification Search .......... 248/599, 248/600, 624, 123.11, 292.12, 297.11, 917, 248/157; 361/682
See application file for complete search history.

(56) References Cited

U.S. PATENT DOCUMENTS

| | | | |
|---|---|---|---|
| 5,329,289 A * | 7/1994 | Sakamoto et al. ......... 345/659 |
| 5,751,548 A | 5/1998 | Hall et al. |
| 5,812,368 A * | 9/1998 | Chen et al. ............... 361/681 |
| 5,941,493 A * | 8/1999 | Cheng ..................... 248/371 |
| 6,061,104 A * | 5/2000 | Evanicky et al. ......... 248/274.1 |
| 6,189,842 B1 * | 2/2001 | Bergeron Gull et al. ... 248/125.1 |
| 6,216,989 B1 * | 4/2001 | Shioya et al. ............ 248/122.1 |
| 6,427,288 B1 * | 8/2002 | Saito ........................ 16/361 |
| 6,478,275 B1 * | 11/2002 | Huang ..................... 248/284.1 |
| 6,517,040 B1 * | 2/2003 | Wen ......................... 248/278.1 |
| 6,702,238 B1 * | 3/2004 | Wang ....................... 248/125.8 |
| 6,712,321 B1 * | 3/2004 | Su et al. .................. 248/123.11 |
| 6,874,738 B2 * | 4/2005 | Ishizaki et al. ............ 248/176.3 |
| 6,874,743 B2 * | 4/2005 | Watanabe et al. ......... 248/276.1 |
| 6,966,532 B2 * | 11/2005 | Ishizaki et al. ............ 248/274.1 |
| 7,036,787 B1 * | 5/2006 | Lin ........................... 248/676 |
| 2004/0256523 A1 * | 12/2004 | Jeong et al. .............. 248/125.9 |
| 2005/0041379 A1 * | 2/2005 | Jang ......................... 361/681 |

(Continued)

FOREIGN PATENT DOCUMENTS

DE 299 08 098 9/1999

(Continued)

*Primary Examiner*—J. Allen Shriver, II
*Assistant Examiner*—Nkeisha J Dumas
(74) *Attorney, Agent, or Firm*—Ked & Associates, LLP (57) ABSTRACT

A mount for an image display apparatus allows a viewing angle, height, and aspect ratio of the image display apparatus to be adjusted. The mount includes a base, a support member disposed vertically with respect to the base, and an elevator which moves up and down within the support member. An upper bracket is engaged with the elevator, and a pivot bracket is engaged with a rear surface of the image display apparatus and rotates about a pivot shaft of the upper bracket. Rotation of the bracket causes an activation bar to move up and down, for forcing a holder into a fixed position or a released position the holder from. The holder prevents rotation of the display if the display is not already positioned at its upper position. The holder also prevents downward movement of the display if the display has been rotated.

22 Claims, 7 Drawing Sheets

U.S. PATENT DOCUMENTS

2006/0175476 A1* 8/2006 Hasegawa et al. ........ 248/125.1
2006/0219849 A1* 10/2006 Chiu ....................... 248/125.8

FOREIGN PATENT DOCUMENTS

| | | |
|---|---|---|
| EP | 0989479 | 3/2000 |
| EP | 1 536 398 | 6/2005 |
| GB | 2 358 345 | 7/2001 |
| JP | 11153960 | 6/1999 |
| JP | 11153961 | 6/1999 |
| WO | WO 2004/019308 | 3/2004 |

* cited by examiner

Fig.1

(Related art)

Fig.2

(Related art)

MOUNT FOR IMAGE DISPLAY APPARATUS

BACKGROUND OF THE INVENTION

1. Field of the Invention

The invention relates to a mount for an apparatus, and more particularly, to a mount for a display apparatus such as a liquid crystal display (LCD) or a plasma display panel (PDP).

2. Description of the Related Art

In general, a viewing angle of an image display apparatus such as a television set or a monitor can be adjusted Using a conventional mount for the image display apparatus, the image display apparatus can be rotated to secure several viewing angles. Another mount for an image display apparatus allows the image display apparatus to be rotated by 90 degrees to perform an aspect ratio conversion. Using this type of mount, an image display apparatus which has an aspect ratio of, for example, 4:3 or 16:9 can be rotated by 90 degrees to have a converted aspect ratio of 3:4 or 9:16, respectively.

When using a computer and associated monitor, it is often advantageous that a vertical length of the monitor is larger than a horizontal length of the monitor. Such an aspect ratio conversion function is useful in this type of situation. A mount for an image display apparatus which includes a height adjustment function in addition to the aspect ratio conversion function is also available.

Figure 1:
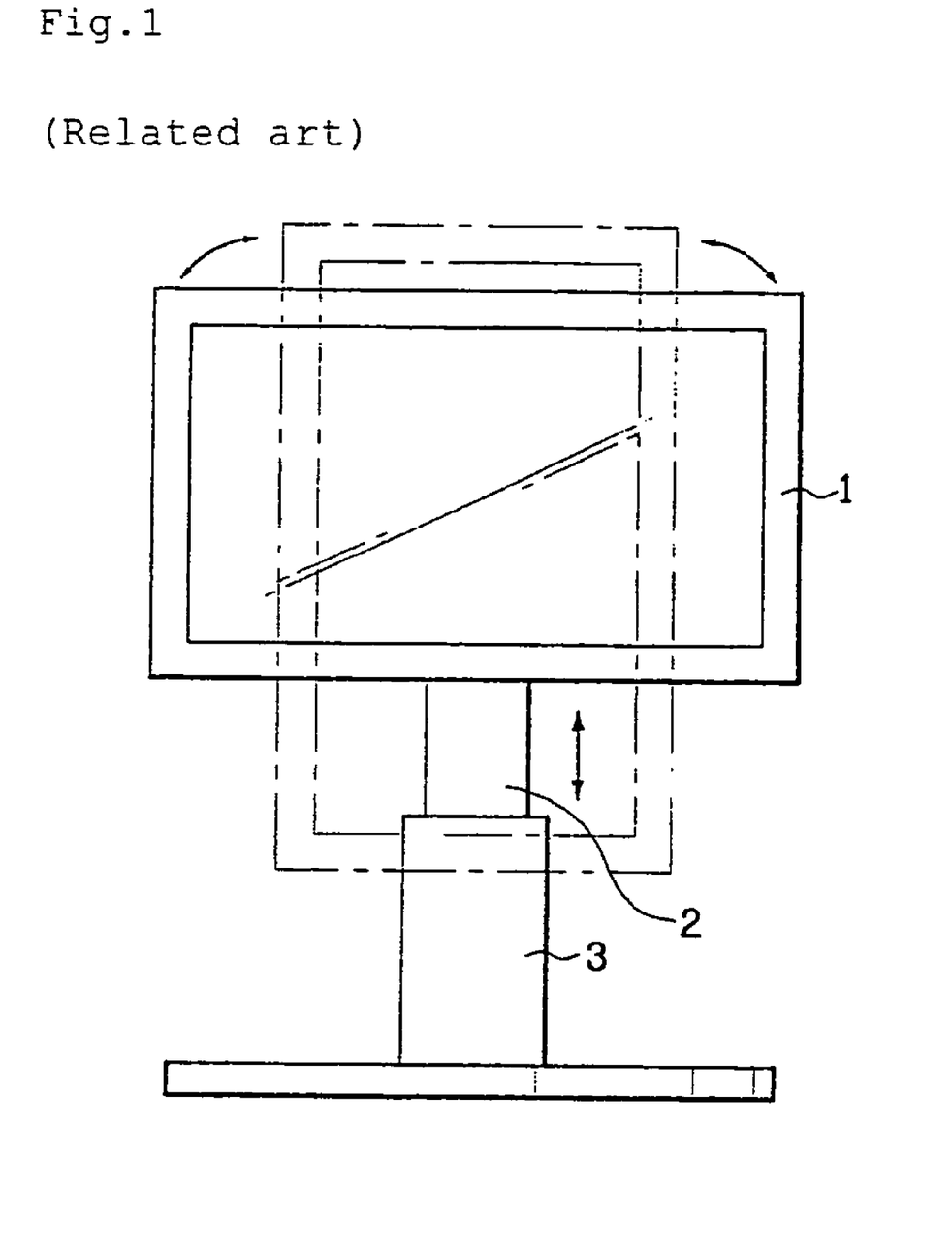
FIGS. 1 and 2 are front and side views respectively, of a related-art mount for an image display apparatus which has an aspect ratio conversion function and a height adjustment function.
Figure 2:
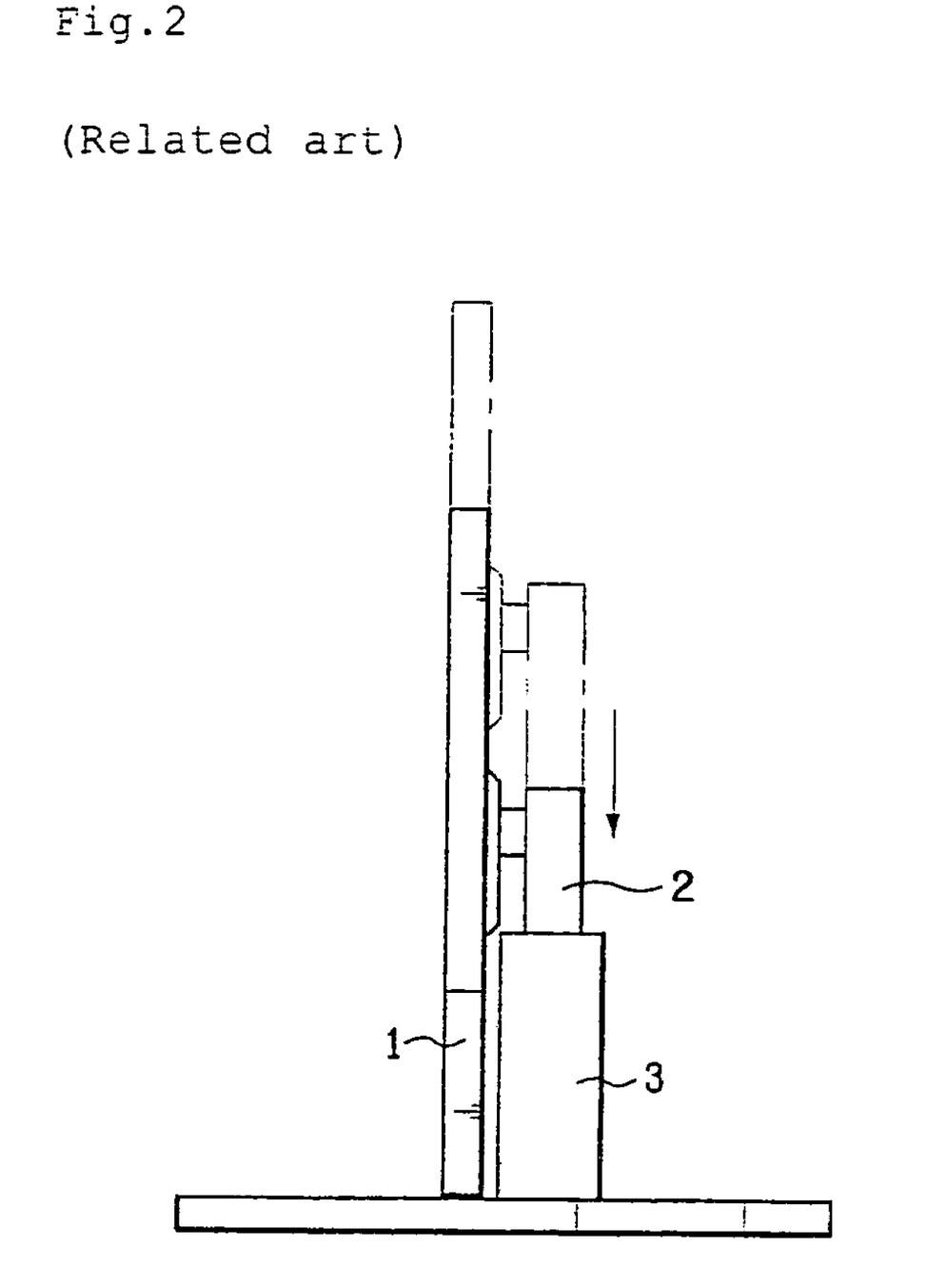

FIGS. 1 and 2 illustrate a conventional mount for an image display apparatus which has a height adjustment function as well as an aspect ratio conversion function. The mount includes a base 3, a support member 2 coupled to the base 3 which moves up and down, and an image display apparatus 1 which rotates about the center of the screen However, this type of mount has a drawback in that, when the image display apparatus 1 is rotated such that its vertical length is larger than a horizontal length and a corresponding aspect ratio is converted accordingly, the image display apparatus 1 must also be adjusted in height to prevent its lower end from coming into contact with the base 3 or another such surface, thereby damaging the image display apparatus 1 or the base 3. This becomes increasingly problematic as a size of the image display apparatus becomes larger.

SUMMARY OF THE INVENTION

An object of the invention is to solve at least the above problems and/or disadvantages and to provide at least the advantages described hereinafter.

To achieve these and other advantages, and in accordance with the purpose of the invention as embodied and broadly described herein, there is provided a mount for an image display device, including a base, a support member positioned substantially vertically with respect to the base, and an elevator which moves up and down with respect to the support member.

An activating unit controls movement of the elevator based on a relative position of a pair of brackets which couple the image display apparatus to the activating unit. The activating unit prevents the display from being rotated into a position wherein the vertical length is greater than the horizontal length if the display is not already in the elevated position. The activating unit also provides the display from being lowered when the display is in this orientation.

Additional advantages, objects, and features of the invention will be set forth in part in the description which follows and in part will become apparent to those having ordinary skill in the art upon examination of the following or may be learned from practice of the invention. The objectives and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings, in which like reference numerals refer to like elements, and wherein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
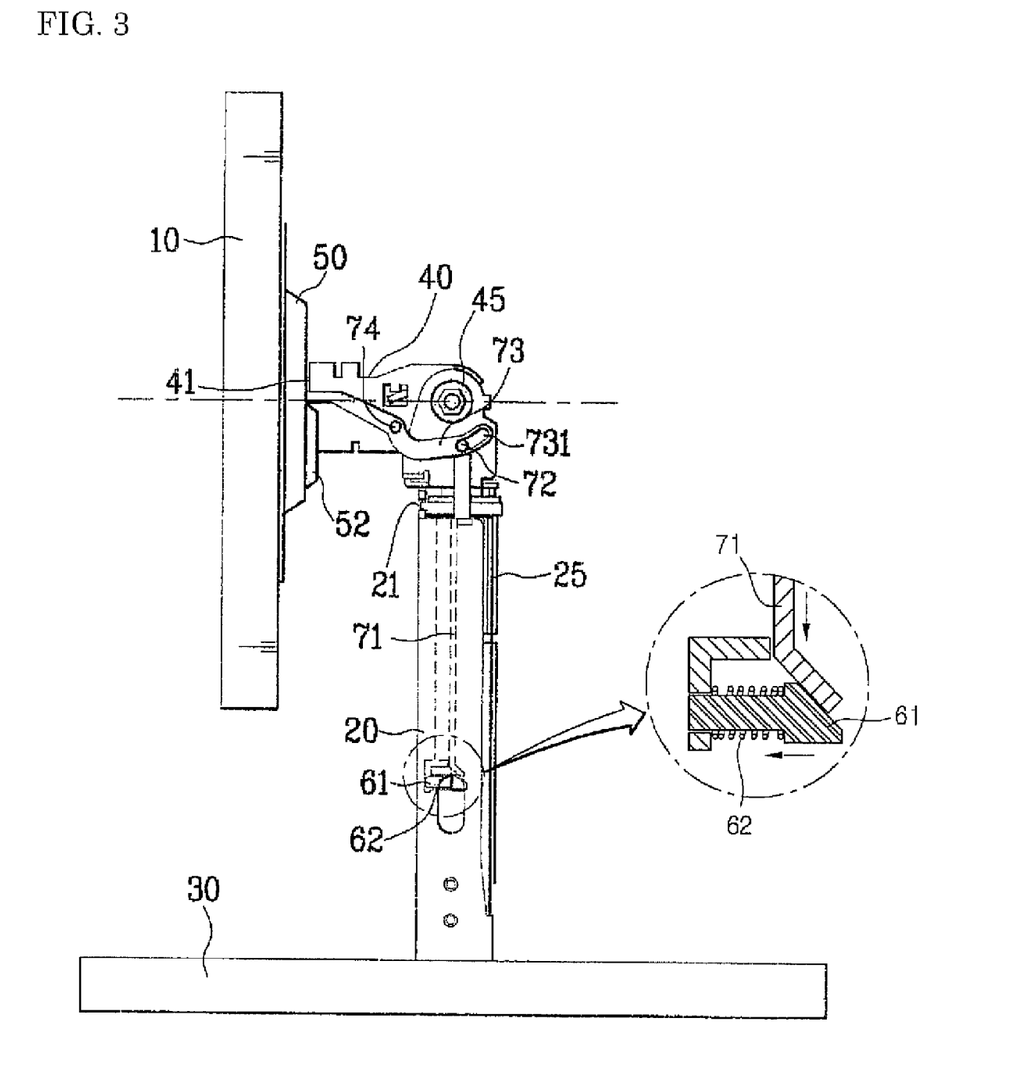
FIGS. 3 and 4 are side views of an image display apparatus engaged with a mount in accordance with an embodiment of the invention.
Figure 4:
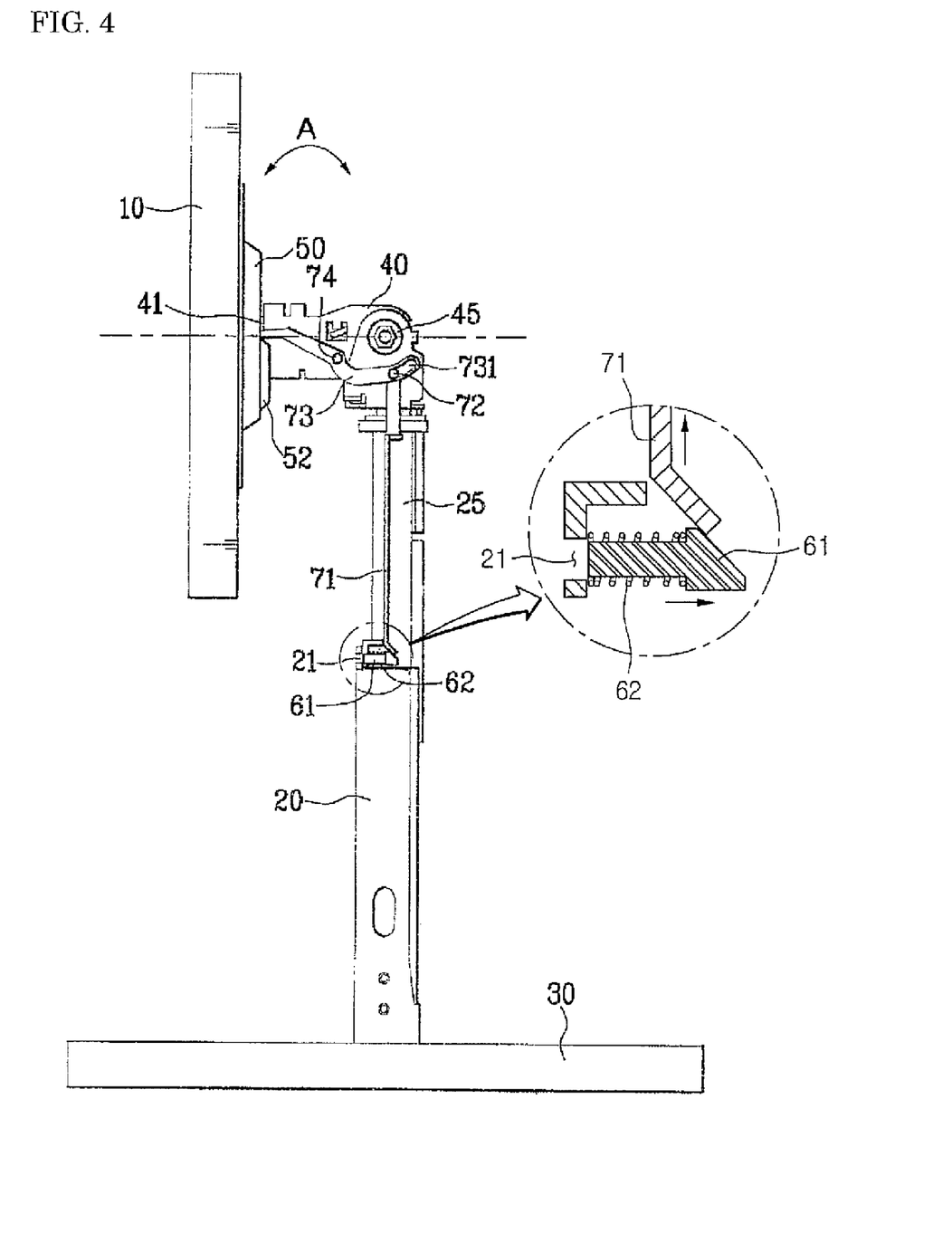

Referring to FIGS. 3 and 4, a mount for an image display apparatus may include a base 30, a support member 20 disposed substantially vertically with respect to the base 30, an elevator 25 engaged with the support member 20 to move up and down, an upper bracket 40 which rotates about a hinge assembly 45 provided at an upper end of the elevator 25, and a pivot bracket 50 which rotates about a pivot shaft 41 provided at a front end of the upper bracket 40.

The support member 20 may include a fixing groove part 21 at its upper portion. A holder 61 and a spring 62 may be provided at a lower portion of the elevator 25. The holder 61 is moved back and forth in response to a rotation of the pivot bracket 50 and accordingly, is introduced into and withdrawn from the fixing groove part 21. The spring 62 elastically supports the holder 61 with respect to the elevator 25.

An activation bar 71 moves up and down within the elevator 25, and moves the holder 61 back and forth, as a lower end of the activation bar 71 is in contact with a rear portion of the holder 61. The rear portion of the holder 61 may be slanted corresponding to a slant of the lower end of the activation bar 71. When the slanted lower end of the activation bar 71 descends and comes into contact with the slanted rear portion of the holder 61, this causes the holder 61 to be advanced forward and introduced into the fixing groove part 21. When the activation bar 71 ascends, the holder 61 is withdrawn from the fixing groove part 21 owing to an elastic force of the spring 62.

An upper end of the activation bar 71 may be engaged to a connection pin 72. A link member 73 provided with the upper bracket 40 may be engaged to rotate about a rotary shaft 74, and may include a long groove 731 for movably receiving the connection pin 72. The long groove 731 is shown as a concave-shaped groove inclined toward the hinge assembly 45, however, other shapes and inclinations may also be appropriate. The long groove 731 allows the display screen 10 and portions of the upper bracket 40 to pivot around the hinge assembly 45, to thereby adjust a viewing angle of the display screen 10.

Figure 5:
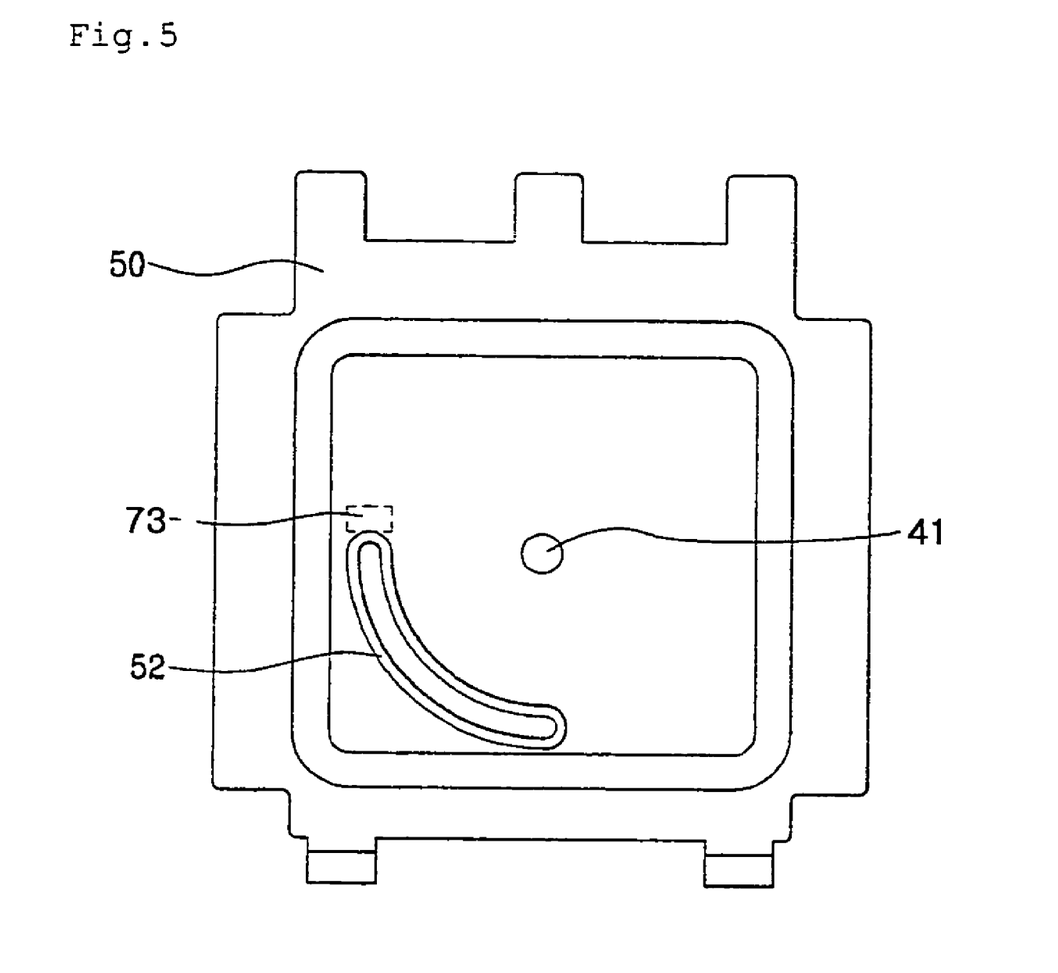
FIG. 5 is a view illustrating a pivot bracket in a mount for an image display apparatus in accordance with an embodiment of the invention.

An end of the link member 73 may be disposed adjacent a rear surface of the pivot bracket 50. As shown in FIG. 5, a projection 52 projects from a rear surface of the pivot bracket 50 to make contact with the end of the link member 73. The projection 52 may be convex-shaped, or any other such shape which would provide for suitable contact with the link member 73. When the pivot bracket 50 is rotated about the pivot shaft 41, the projection 52 serves to move the end of the link member 73 up and down. In other words, contact between the projection 52 and the end of the link member 73 will cause the link member to pivot in a clockwise direction around the rotary shaft 74. This causes the connection pin 72 to move downward.

A stopper (not shown) and a spring (not shown) may be provided) at an upper end of the support member 20 to limit upward movement of the elevator 25, and to elastically support the elevator 25 with respect to the support member 20. The stopper (not shown) may prevent the elevator 25 from being separated from the support member 20, and the spring (not shown) allows the elevator 25 to be supported at a predetermined height.

An operation of the mount for the image display apparatus will be described as follows.

First, an angular position of the image display apparatus 10 may be adjusted by angling the display 10 and upper bracket 40 about the hinge assembly 45 in the direction shown by the arrow A. As the image display apparatus 10 is moved through this angular adjustment A, the upper bracket 40 and the pivot bracket 50 engaged with the image display apparatus 10 rotate about the hinge assembly 45. At the same time, the link member 73, which is engaged with the upper bracket 40 through the rotary shaft 74, also rotates about the hinge assembly 45. The connection pin 72 moves in the long groove 731 of the link member 73, and this angular rotation of the image display apparatus 10 has no influence on the activation bar 71.

As shown in FIG. 3, when a horizontal length is larger than a vertical length of the image display apparatus 10 and it is adjusted downward in height, the projection 52 of the pivot bracket 50 is at a position which is lower than the pivot shaft 41, as shown in FIG. 5. In this position, the end of the link member 73 is stopped and supported on an upper portion of the projection 52, as shown in FIGS. 3 and 5. At this time, the holder 61 is positioned inside of the elevator 25, and the elevator 25 can move upward and downward along the support member 20 to adjust the height of the image display apparatus 10.

Figure 6:
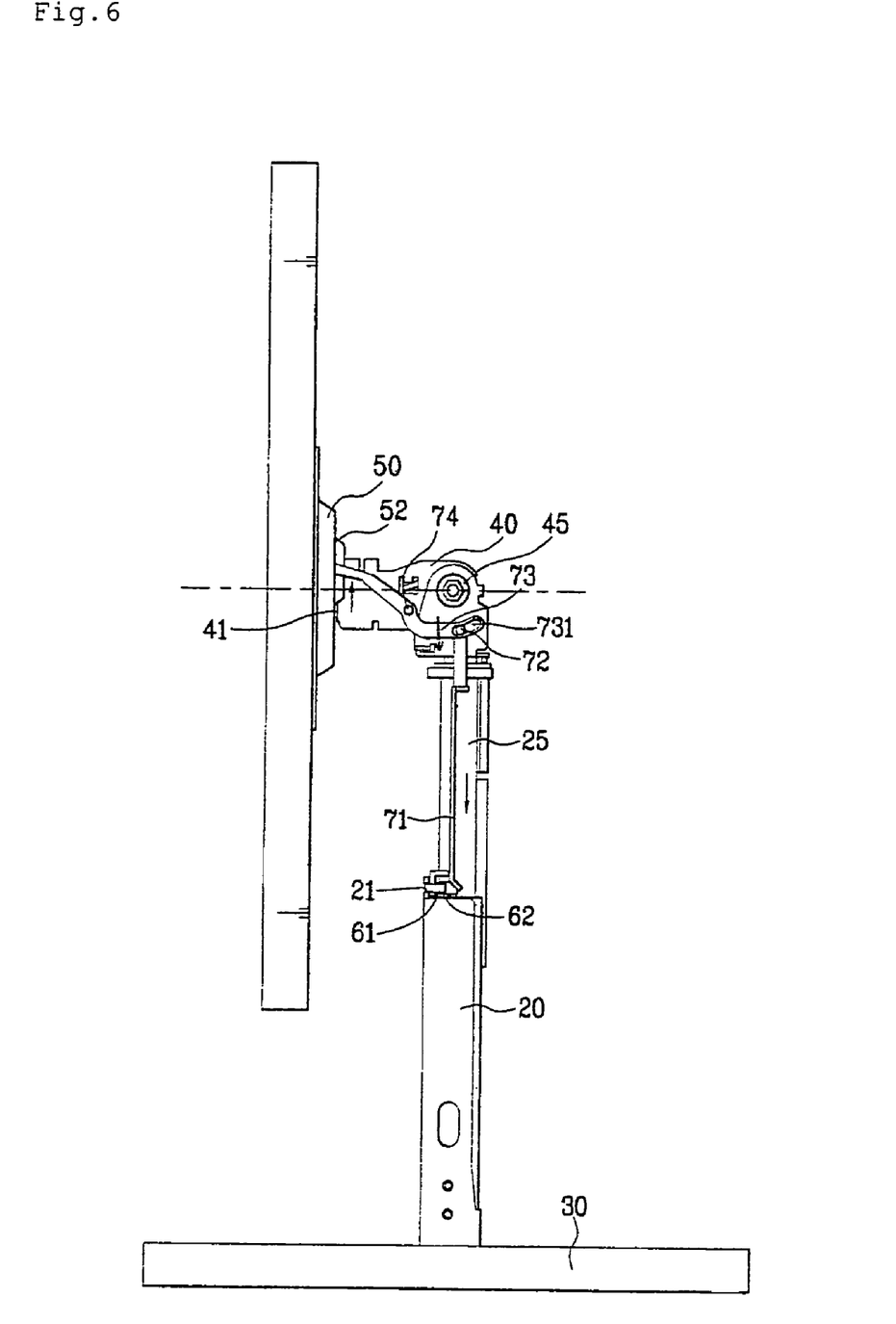
FIGS. 6 and 7 illustrate mechanisms for controlling a vertical adjustment function in a mount for an image display apparatus in accordance with an embodiment of the invention.
Figure 7:
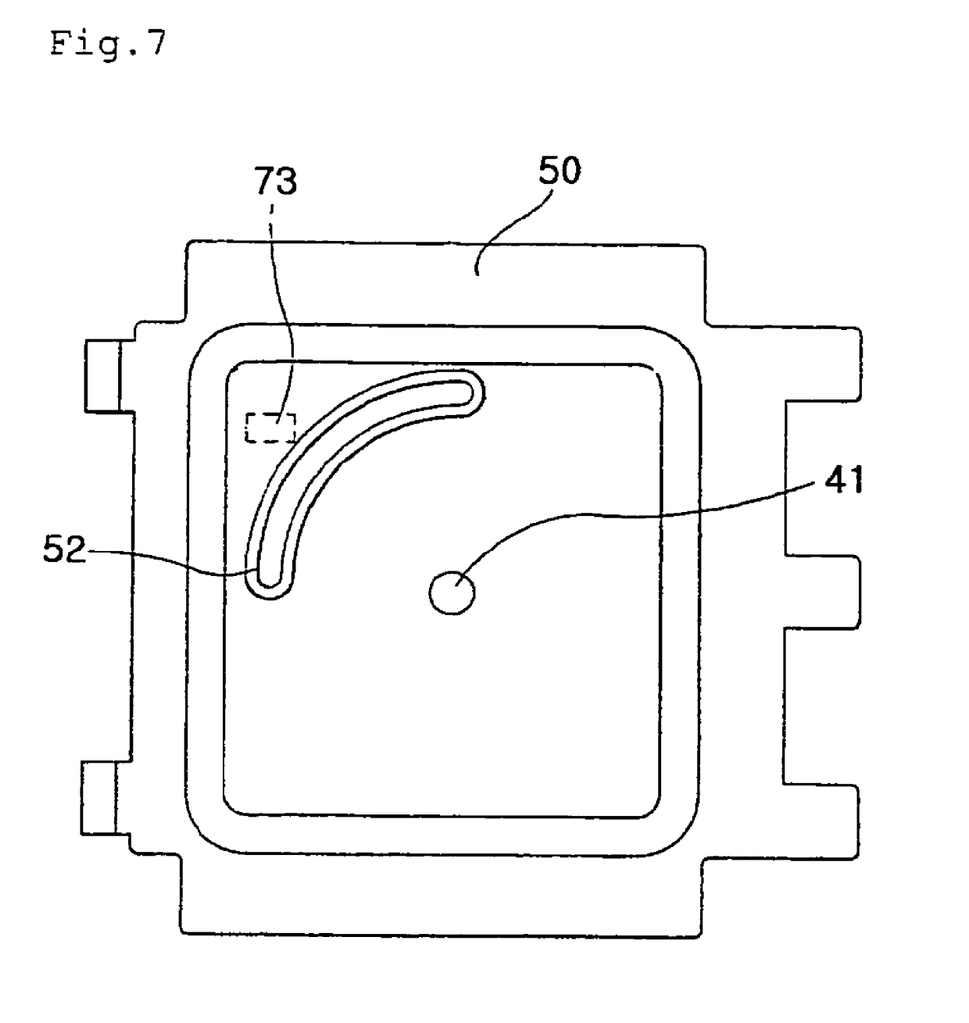

When the image display apparatus 10 is rotated such that its vertical length is larger than its horizontal length, as shown in FIGS. 6 and 7, the pivot bracket 50 is rotated about the pivot shaft 41 and the projection 52 causes the end of the link member 73 to move upward.

When the pivot bracket 50 end of the link member 73 is moved upward, the link member 73 is rotated about the rotary shaft 74 and the long groove 731 end of the link member 73 is moved downward. The connection pin 72 engaged in the long groove 731 is also moved downward, and the activation bar 71 moves downward. Thus, the lower end of the activation bar presses down on the rear slanting surface of the holder 61. This movement of the activation bar 71 forces the holder 61 to be introduced into the fixing groove part 21 of the support member 20, and the holder 61 holds the elevator 25 in place relative to the support member 20. Thus, a downward force applied to the image display apparatus 10 will not cause the elevator 25 to descend, and the image display apparatus 10 is fundamentally prevented from being damaged due to such a descent.

When the image display apparatus 10 is to descend, it may be rotated in an opposite direction such that its horizontal length is larger than the vertical length. If so, the pivot bracket 50 rotates about the pivot shaft 41, and the projection 52 moves downward while the end of the link member 73 moves downward. When the pivot bracket 50 end of the link member 73 moves downward, the link member 73 rotates about the rotary shaft 74 and accordingly, the long groove 731 end of the link member 73 moves upward.

The connection pin 72 moves upward, causing the activation bar 71 to move upward and release the holder 61. The holder 61 is then withdrawn from the fixing groove part 21 of the support member 20 due to the elastic force of the spring 62 and the image display apparatus 10 may be moved down.

The mount for an image display apparatus in accordance with the invention as embodied and broadly described herein is designed such that, when the image display apparatus is positioned with its vertical length larger than its horizontal length, the image display apparatus is prevented from any unintentional downward adjustment in height, thereby preventing damage to the image display apparatus.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mount for an image display apparatus, comprising:
   a base;
   a support member fixed to and extending vertically from the base;
   an elevator engaged with the support member and configured to move up and down along a length of the support member while the support member remains stationary so as to adjust an orientation of a display apparatus configured to be coupled to the mount, wherein the elevator includes a holder configured to engage a fixing groove formed in the support member so as to maintain an orientation of the display apparatus;
   an upper bracket coupled to an upper portion of the elevator;
   a pivot bracket coupled to the upper bracket and configured to rotate about a pivot shaft, wherein the pivot bracket is configured to receive the display apparatus; and
   an interlink mechanism which is configured to cause the holder to engage with the fixing groove so as to prevent the elevator from moving downward relative to the support member and maintain an orientation of the display apparatus, and to disengage with the fixing groove so as to allow the elevator to move relative to the support member and adjust an orientation of the display apparatus, wherein the interlink mechanism comprises:
   a link member mounted on the upper bracket; and
   an activation bar mounted on the elevator, wherein a first end of the activation bar is coupled to the holder, wherein a second end of the activation bar is coupled to the link member, and wherein movement of the link member causes the activation bar to force the holder to engage with the fixing groove.

2. The mount of claim 1 wherein the link member has a first end that is engaged with the pivot bracket and a second end that is engaged with the second end of activation bar.

3. The mount of claim 2, wherein the pivot bracket includes a projection, wherein when the pivot bracket is oriented in a first position, the projection does not engage the link member, and wherein when the pivot bracket is oriented in a second position, the projection engages the first end of the link member to cause the link member to rotate.

4. The mount of claim 3, wherein when the pivot bracket is oriented in the second position and the link member is caused to rotate, the rotation of the link member causes the activation bar to move, to thereby cause the holder to engage the fixing groove.

5. The mount of claim 4, wherein the upper bracket includes a hinge assembly which allows the upper bracket and the pivot bracket to be angled, to thereby allow for adjustment of a viewing angle of a display mounted to the pivot bracket.

6. The mount of claim 5, wherein the link member includes a long groove, wherein a pin on the second end of the activation bar is engaged in the long groove, and wherein when the upper bracket and the link member are rotated around the hinge assembly, the pin is allowed to move along the long groove of the link member.

7. The mount of claim 1 wherein at least one of the holder and the activation bar include a slanted end which is configured such that movement of the activation bar causes the holder to move into engagement with the fixing groove.

8. The mount of claim 1 further comprising a biasing member that biases the holding member away from engagement with the fixing groove.

9. The mount of claim 1, wherein the upper bracket includes a hinge assembly which allows the upper bracket and the pivot bracket to be angled, to thereby allow for adjustment of a viewing angle of a display mounted to the pivot bracket.

10. A mount for an image display apparatus, comprising:
a base;
a stationary support member fixed to the base;
an elevator engaged with the stationary support member and configured to move up and down along a length of the stationary support member while the stationary support member remains in a fixed position so as to adjust an orientation of a display apparatus configured to be received by the mount;
an upper bracket engaged with an upper portion of the elevator;
a pivot bracket mounted on the upper bracket and configured to be engaged with a rear surface of an image display apparatus, wherein the pivot bracket can rotate to different orientations; and
an activating unit configured to prevent or allow up and down movement of the elevator depending on a rotational orientation of the pivot bracket, wherein the activating unit comprises:
a link member mounted on the upper bracket, wherein a first end of the link member is coupled to the pivot bracket;
an activation bar mounted on the elevator, wherein a fwst end of the activation bar is coupled to a second end of the link member; and
a holder mounted on the elevator and configured to hold the elevator in a fixed position, wherein a second end of the activation bar is coupled to the holder.

11. The mount of claim 10, wherein the upper bracket includes a binge assembly which allows for adjustment of an angle of the pivot bracket, which in turn allows for adjustment of a viewing angle of a display mounted on the pivot bracket.

12. The mount of claim 10, wherein when the pivot bracket is moved from a first rotational orientation to a second rotational orientation, the pivot bracket causes the link member to move.

13. The mount of claim 12, wherein movement of the link member causes the activation bar to move, and wherein movement of the activation bar causes the holder to move to prevent downward movement of the elevator.

14. The mount of claim 13, wherein the pivot bracket includes a projection, aura wherein when the pivot bracket is rotated from the first rotational orientation to the second rotational orientation, the projection engages the first end of the link member to cause movement of the link member.

15. The mount of claim 13, wherein the support includes a fixing groove, and wherein movement of the activation bar causes the holder to engage the fixing groove, to thereby prevent downward movement of the elevator.

16. The mount of claim 15, wherein at least one of the holder and the activation bar include a slanted end which is configured such that movement of the activation bar causes the holder to move into engagement with the fixing groove.

17. The mount of claim 10, wherein a pin on the activation bar is engaged in a slot on the link member such that movement of the link member causes movement of the activation bar.

18. The mount of claim 17, wherein the upper bracket includes a hinge assembly that allows the pivot bracket to be tilted, wherein the slot in the link member is an elongated slot, and wherein tilting of the pivot bracket will cause the pin on the activation bar to move along the elongated slot but tilting of the pivot bracket will not cause movement of the activation bar.

19. The mount of claim 1, wherein the elevator is configured to move up and down along the support member in response to a rotation of the pivot bracket and a display apparatus coupled thereto about the pivot shaft, and wherein the display apparatus remains in substantially the same vertical plane as it rotates about the pivot shaft and moves up and down.

20. The mount of claim 19, wherein the elevator is configured to move up along the support member and cause a corresponding upward movement of the pivot bracket in response to a rotation of the display apparatus from a landscape orientation to a portrait orientation, and to move down along the support member and cause a corresponding downward movement of the pivot bracket in response to a rotation of the display apparatus from a portrait orientation to a landscape orientation.

21. A mount for an image display apparatus, comprising:
a support member that extends vertically from a base;
an elevator configured to move up and down along the support member, wherein the elevator includes a holder configured to engage a fixing groove formed in the support member;
an upper bracket coupled to an upper portion of the elevator;
a pivot bracket coupled to the upper bracket and to a display apparatus; and
an interlink mechanism configured to prevent the elevator from moving downward in the support member, wherein the interlink mechanism comprises:
a link member mounted on the upper bracket; and an activation bar mounted on the elevator, wherein a first end of the activation bar is coupled to the holder and a second end of the activation bar is coupled to the link member, and wherein movement of the link member causes the activation bar to force the holder to engage with the fixing groove.

22. A mount for an image display apparatus, comprising:

a support member mounted on a base;

an elevator engaged with the support member and configured to move up and down;

an upper bracket engaged with an upper portion of the elevator;

a pivot bracket mounted on the upper bracket and configured to be engaged with a rear surface of an image display apparatus; and an activating unit configured to prevent or allow up and down movement of the elevator depending on a rotational orientation of the pivot bracket, wherein the activating unit comprises:

a link member mounted on the upper bracket, wherein a first end of the link member is coupled to the pivot bracket;

an activation bar mounted on the elevator, wherein a first end of the activation bar is coupled to a second end of the link member; and a holder mounted on the elevator and configured to hold the elevator in a fixed position, wherein a second end of the activation bar is coupled to the holder.

* * * * *